Nov. 29, 1960 O. H. FERNALD 2,962,621

COLOR TELEVISION APPARATUS

Filed Oct. 10, 1958

WITNESSES:
Bernard R. Gieguez
James T. Young

INVENTOR
Olaf H. Fernald

BY Benjamin DeWitt
ATTORNEY

United States Patent Office
2,962,621
Patented Nov. 29, 1960

2,962,621

COLOR TELEVISION APPARATUS

Olaf H. Fernald, Point Pleasant Beach, N.J., assignor to Westinghouse Electric Corporation, East Pittsburgh, Pa., a corporation of Pennsylvania Filed Oct. 10, 1958, Ser. No. 766,473
6 Claims. (Cl. 315—8)

This invention relates to color television image display apparatus and, more particularly, to picture tubes having magnetic shields for preventing the magnetic field of the earth and other stray magnetic fields from affecting the color fidelity of the displayed image.

Present day color picture tubes depend on the angle of arrival of the electron beam or beams at the color phosphor screen to separate the various colors. For example, in shadow mask picture tubes, a change in the angle of arrival of the electron beams at the screen of slightly over 1° may cause the displayed color to change from red to green. Hence even weak magnetic fields such as the earth's field can deflect the electron beams, change their angle of arrival at the screen and hence destroy the color fidelity or "purity" of the color image. In the past in order to compensate for the effect of the earth's magnetic field and other stray magnetic fields upon the operation of the picture tube of color television receivers it has been the practice to provide magnetic shields or rings of magnets arranged circumferentially around the face or bulb areas of the picture tubes. It has been found that such receivers when shipped to the customer's home may have the aperture mask, the aperture mask frame, and the field neutralizing shields partially magnetized. It has also been found that the aperture mask, the aperture mask frame and the field neutralizing shield of such a picture tube may become magnetized while in a first position in the customer's home so that when the receiver is reoriented or moved to another position, the purity of the color displayed is affected. The foregoing magnetization effects have had the disadvantage of requiring a service call to readjust the receiver each time that it is moved. Previously used magnetic shields have been very expensive.

My invention eliminates magnetization of the aperture mask, the aperture mask frame and the field neutralizing shields of color picture tubes and thereby reduces service calls for receiver adjustment. My invention uses, with a color picture tube, a relatively inexpensive shield which is degaussed each time the television receiver is turned on or off. In embodiments of my invention a damped resonant circuit including a degaussing coil around the magnetic shield is shock excited each time the associated television receiver is turned on or off, and generates damped oscillations which subject the shield, the aperture mask frame and the aperture mask to progressively decreasing minor hysteresis loops, thereby degaussing the picture tube.

An object of my invention is to degauss the magnetic shield which surrounds the image display screen of a color picture tube each time the television receiver is turned on or off.

Another object of this invention is to degauss the aperture mask of a color television picture tube automatically without requiring a serviceman.

A further object of this invention is to provide automatic degaussing for color television receivers so that such receivers may be moved from one location to another and otherwise reoriented without affecting the purity of the displayed color image and without requiring a degaussing operation by a serviceman.

The foregoing and other objects of my invention will be apparent from the following description taken in accordance with the accompanying drawing, throughout which like reference characters indicate like parts, which drawing forms a part of this application and in which.

Figures 2, 3, 4, 5:
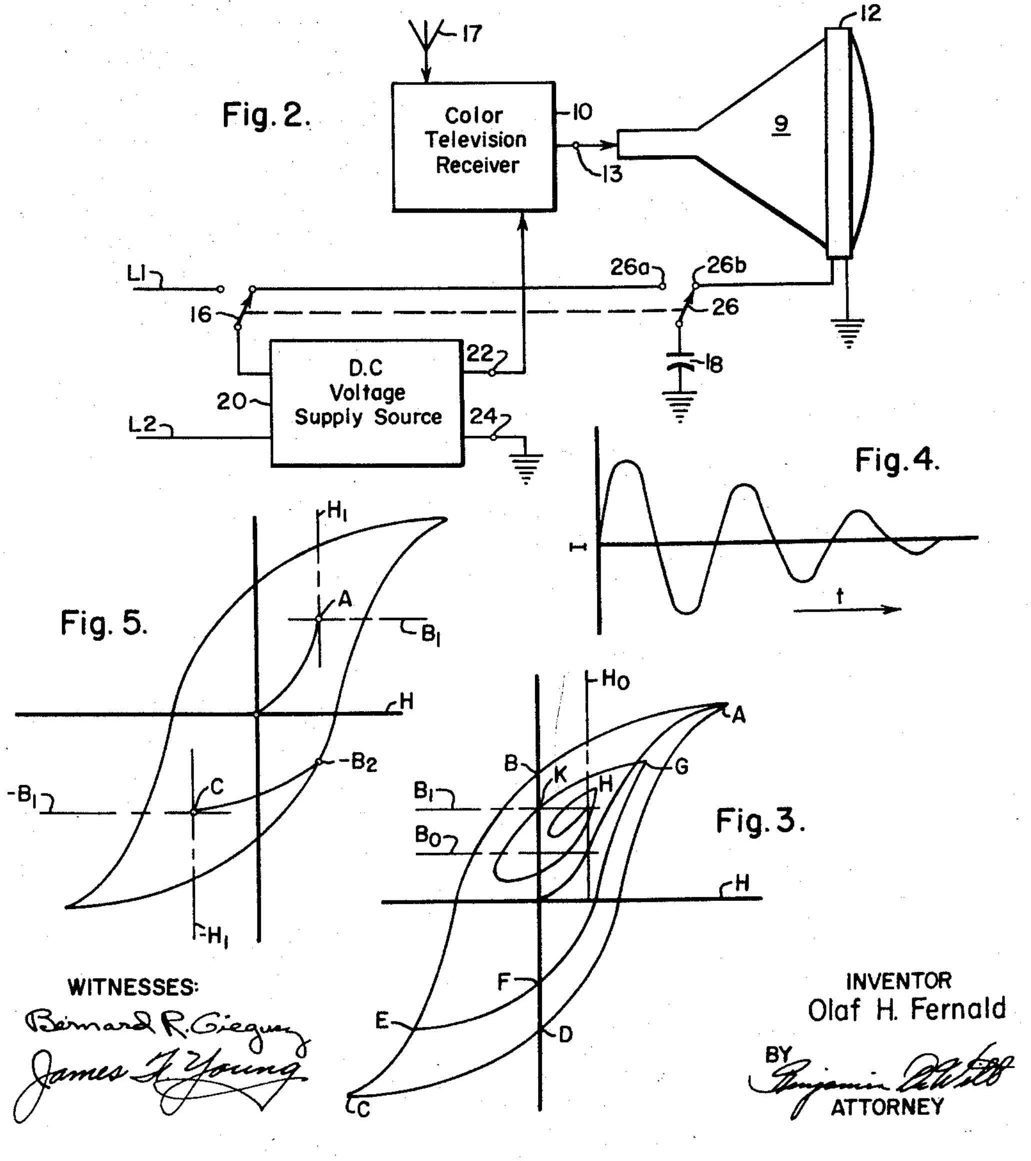
Fig. 2 is a circuit diagram partially in schematic form of another embodiment of my invention.
Fig. 3 illustrates the hysteresis loop generated in the magnetic shield by the degaussing circuits of Fig. 1 or Fig. 2.
Fig. 4 illustrates the wave form of the current oscillation in the degaussing coil which current results from the action of the circuits of Fig. 1 or Fig. 2.
Fig. 5 is a magnetization diagram illustrating the action of ferro-magnetic materials under the influence of weak magnetic fields.

The normal action of ferro-magnetic materials in the presence of weak magnetic fields is shown in Fig. 5. If an object formed of magnetic material is initially demagnetized and then placed in a magnetic field $H_1$, it will assume a flux density $B_1$ corresponding to the point A of Fig. 5. The shielding ability of the magnetic material under such conditions is determined by the effective permeability $B_1/H_1$ equals $\mu_1$. If, however, the initially demagnetizing material were first placed in the same field strength but with the opposite orientation such that the initial field correspond to $-H_1$, the material would assume a flux density of $-B_1$ corresponding to point C of Fig. 5. If the object comprising the magnetic material were then rotated 180° with respect to the magnetic field, the applied magnetic field would correspond to a magnetic field $H_1$, however, the magnetic material would assume a different flux density $-B_2$ resulting in an effective permeability $+\mu_2=-B_2/H_1$. This new effective permeability can be negative under certain circumstances. Thus it is seen that the effective permeability and hence the shielding ability of the material is dependent upon its past magnetic history. The effectiveness of a given magnetic shield as used with a color picture tube thus depends not only on its shape, thickness and location, but also upon its effective magnetic permeability and its past history; generally, the higher the effective permeability is, the higher will be the shielding ability of the particular shield. With a sufficiently high effective permeability in a shield used with a color picture tube it is possible to reduce the effect of the earth's magnetic field to a point where the earth's field has a negligible influence on the electron beams in the color tube.

Figure 1:
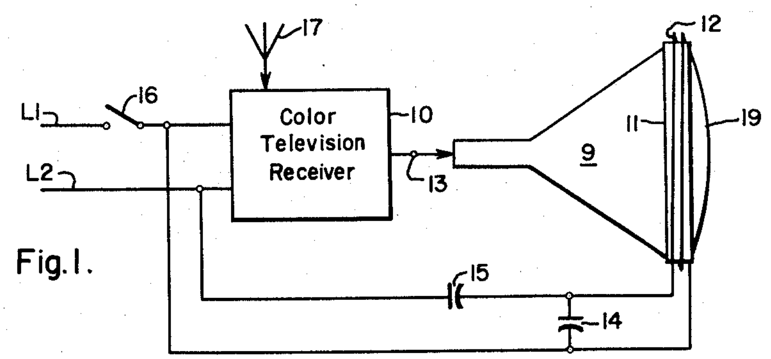
Fig. 1 is a circuit diagram of one embodiment of my invention.

Referring now to Fig. 1 of the drawing, there is shown a color television receiver 10 adapted to receive and translate composite television signals which are intercepted by an antenna 17. The television signals normally include a monochrome component and a plurality of chromaticity components. The precise form of the signals and the signal translating circuits of receiver 10 do not constitute a part of the present invention, and hence it is sufficient to note that the receiver 10 may include the conventional amplifier, mixer, and detector circuits together with any one of various conventional circuits, for separately deriving the different color signals, and for supplying both the color signals and the monochrome signals to a picture display cathode ray tube 9. The usual monochrome and color signals are applied to the picture reproducing device 9 by way of one or more signal translating channels represented diagrammatically by the conductor 13. As shown in Fig. 1, the picture reproducing device comprises a cathode ray tube 9 having a plurality of electron guns to which the video signals are applied and having a tri-color display screen 19 on which the modulated electron beams impinge.

The picture tube 9 has a magnetic shield 11 surrounding the periphery of the tube adjacent the screen end of the tube. In accordance with the present invention the shield 11 may be located either exteriorly or interiorly of the evacuated tube 9. The shield 11 has a degaussing coil 12 arranged thereon so that current flowing in the coil 12 will induce magnetic flux in the high permeability material of the shield 11. The coils 12 in addition to serving as a degaussing coil may also be arranged to serve as magnetic field neutralizing coils for the picture tube 9 in accordance with the conventional arrangement of such field neutralizing coils. The degaussing coil 12 has a capacitor 14 shunted thereacross, and is connected in series with a capacitor 15 and a switch 16 to the A.C. supply lines L1 and L2. The switch 16 is the usual on-off switch for selectively energizing the color television receiver 10.

The color picture tube 9 may in one embodiment be a tube of the aperture mask type which is well-known in the art and which includes an aperture mask located inside the tube which mask is normally formed of magnetic material. The support frame for the aperture mask is located within the tube peripherally of the mask and normally provides a substantial amount of shielding around the path of the electron beams from the electron guns to the screen 19. It is to be understood that the shield 11 of the present invention may be located within the evacuated tube 9 and when so located may be used, if so desired, as a support frame for the aperture mask.

The degaussing coil 12 and the capacitors 14 and 15 form a damped resonant circuit which is shock excited when the switch 16 is closed or opened. When so excited oscillatory current will flow in the circuit including coil 12 and capacitor 14 with the current gradually decreasing to zero as shown by Fig. 4. The damped current oscillation flowing through the degaussing coil 12 produces progressively smaller hysteresis loops in the shield 11 as shown by Fig. 3. With an applied magnetic field $H_0$, virgin magnetic material will normally move up the normal magnetization curve to the point $B_0$ giving an effective permeability $B_0/H_0$. When the shield is subjected to the alternating magnetic field caused by oscillating current through the coil 12 the magnetization of shield 11 will move through the hysteresis loop ABCDA, then through the hysteresis loop BEFGK, ending up at the point $B_1/H_0$ where the effective permeability $B_1/H_0$ is greater than $B_0/H_0$. Because of the oscillatory degaussing operation, the magnetic material of the shield 11 will always end up at a magnetic condition $B_1/H_0$ regardless of the past history of the magnetic material. Thus the effect of stray magnetic fields and the earth's magnetic field on the shield 11 and the aperture mask of the tube is canceled and purity of the displayed color image is restored regardless of the nature of the fields to which the tube was subjected prior to the degaussing operation.

In Fig. 2 there is shown a second embodiment of the present invention including a color television receiver 10 corresponding to that of Fig. 1 which receives composite signals from an antenna 17 and translates monochrome and color video signals to a picture display device or cathode ray tube 9. The cathode ray tube 9 may be identical to that of Fig. 1 and is provided with a degaussing coil 12 similar to that of Fig. 1. Operating power is supplied to the color television receiver 10 from the conventional A.C. supply lines L1 and L2 through an on-off switch 16 and a direct current voltage supply source 20 which may comprise conventional rectifier and filter networks known to those skilled in the art. The output terminal 22 of the direct current source 20 is connected to supply B+ voltage to the receiver 10 and is further connected to one terminal 26A of a second switch 26. The other output terminal 24 of the direct current source is connected to ground or a point of reference potential in accordance with conventional practice. The pole of switch 26 is connected serially through a capacitor 18 to ground and is shiftable between the first terminals 26A and the second terminal 26B. The second terminal 26B is connected serially through the degaussing coil 12 to ground.

Switch 26 is ganged with the on-off switch 16 so that when switch 16 is closed to apply power to the direct current source 20, switch 26 is shifted to the contact 26A thereby causing capacitor 18 to be charged to B+ level by current flow from terminal 22. When switch 16 is opened switch 26 moves to contact 26B so that the charge on capacitor 18 flows through switch 26, contact 26B and coil 12 to ground. Coil 12 and capacitor 18 form a resonant circuit which is shock excited by the discharge of capacitor 18 and which will oscillate until the energy from capacitor 18 is dissipated in the inherent resistance of the resonant circuit. The oscillating current flowing in the resonant loop produces progressively smaller minor hysteresis loops in the magnetic material of the cathode ray tube shield in the same manner as described heretofore with reference to Fig. 1. By virtue of the present invention as heretofore described the effective permeability of a magnetic shield is raised to a comparatively high value each time that the television receiver is turned on and off. Accordingly, the present invention enables the use of a relatively inexpensive shield and makes it possible to move the television receiver from place to place without the magnetic field of the earth or any other stray magnetic field affecting the color purity performance of the picture display device.

While the present invention has been disclosed in certain preferred embodiments only, it will be obvious to those skilled in the art that it is not so limited but is susceptible of various changes and modifications without departing from the spirit and scope thereof.

I claim as my invention:

1. In combination with a color television picture tube, means for minimizing the effect of the magnetic field of the earth on the operation of said tube, comprising a magnetic shield extending peripherally around the screen of said tube, a magnetic induction coil positioned adjacent said shield, a resonant circuit including said coil, and means for shock exciting said circuit to produce a transient oscillatory magnetic field in said shield for adjusting the material of said shield to a demagnetized condition of maximum permeability.

2. In combination with a color television receiver having a picture tube, and having an electric switch for turning said receiver on and off, means for minimizing the effect of the magnetic field of the earth on the operation of said tube, comprising a magnetic shield member extending peripherally of the screen of said tube, a magnetic induction coil positioned adjacent said shield, a resonant circuit including said coil, and means including means coupled with said switch for shock exciting said circuit each time said switch is closed and opened to produce a damped alternating magnetic flux in said shield member for conditioning the material of said shield to a demagnetized state of maximum permeability.

3. In combination with a color television receiver having a picture tube, electric power connections, and a switch for supplying power from said connections to said receiver, means for minimizing the effect of the magnetic field of the earth on the operation of said tube, comprising a magnetic shield encircling the screen of said tube for excluding the earths magnetic field to an extent dependent upon the effective permeability of the material of said shield, a coil circumjacent said shield for applying induced magnetic fields to said material, a resonant circuit including said coil, and means connected to said switch for supplying electric power to said circuit when said switch is closed to produce a transient oscillatory magnetic field in said shield for adjusting the material of said shield to a demagnetized condition of maximum permeability.

4. In combination with a color television receiver having a picture tube, electric power connections, and a switch for supplying power from said connections to said receiver, means for minimizing the effect of the magnetic field of the earth upon the operation of said tube, comprising a magnetic shield member encircling the screen of said tube for excluding the earths magnetic field to an extent dependent upon the effective permeability of said shield member, an induction coil circumjacent said shield, a resonant circuit including said coil, and means including said switch for connecting said circuit to said connections when said switch is closed to produce an exponentially decaying oscillatory magnetic field in said shield member for demagnetizing the same.

5. In combination with a color television receiver having a picture tube, electric power connections, and a switch for supplying power from said connections to said receiver, means for minimizing the effect of the magnetic field of the earth upon the operation of said tube, comprising a magnetic shield member circumjacent the screen end of said tube for excluding the earths magnetic field to an extent dependent upon the effective permeability of said shield member, an induction coil circumjacent said shield, a capacitor connected across said coil, and means including another capacitor connected in series with said coil, and said switch, for connecting said coil to said power connections when said switch is closed to produce a damped alternating magnetic flux in said shield member for conditioning the material of said shield to a demagnetized state of maximum permeability.

6. In combination with a color television receiver including an image display tube and a source of direct current for operating the receiver, first switch means for supplying power from an alternating current source to said receiver, means for minimizing the effect of the magnetic field of the earth upon the operation of said tube, said means comprising a magnetic shield member circumjacent the screen of said tube for excluding the earths magnetic field to an extent dependent upon the effective permeability of said shield member, an induction coil circumjacent said shield, a capacitor, and second switch means connected to said capacitor and ganged with said first switch means so as to be commonly operable therewith to connect said capacitor to said direct current source when the receiver is turned on and to said induction coil when the receiver is turned off to produce a damped alternating magnetic flux in said shield member for conditioning the material of said shield to a demagnetized state of maximum permeability.

References Cited in the file of this patent

UNITED STATES PATENTS

| | | |
|---|---|---|
| 2,387,608 | Paumier | Oct. 23, 1945 |
| 2,421,583 | Stuart | June 3, 1947 |
| 2,817,782 | Over et al. | Dec. 24, 1957 |
| 2,832,041 | Trachtenberg | Apr. 22, 1958 |
| 2,860,328 | Langworthy | Nov. 11, 1958 |
| 2,898,509 | Clay et al. | Aug. 4, 1959 |